UNITED STATES PATENT OFFICE.

JOHN GREIVES, OF PATERSON, NEW JERSEY.

ELECTRICAL INSULATING MATERIAL.

SPECIFICATION forming part of Letters Patent No. 291,716, dated January 8, 1884.

Application filed April 30, 1883. (No specimens.)

*To all whom it may concern:*

Be it known that I, JOHN GREIVES, a citizen of the United States, residing in the city of Paterson, county of Passaic, and State of New Jersey, have invented certain new and useful Improvements in Electrical Insulating Materials, fully described and represented in the following specification.

This invention relates to an improvement in insulating materials for electrical conductors, and is applicable, in its various forms, to insulate the parts of electrical apparatus and conduits, and to coat wires for conducting an electrical current.

The material consists in the combination, first, of common rosin and lime-powder united, as hereinafter described; and, secondly, in the combination of the same ingredients with a fixed oil, for the purpose herein set forth.

The rosin I employ is of the common unrefined variety, and the lime-powder may be prepared for mixing therewith by grinding, or by slaking in air or water.

The composition is prepared by melting the rosin and incorporating the lime-powder thoroughly therewith while the rosin is fluid, the mixture, when cold, assuming a hard stone-like character, or displaying a softer quality, in proportion to the amount of each ingredient used. The lime-powder is always used in excess of the rosin, to avoid the frangibility of the latter, and the most solid composition is secured by mixing about sixty-five per cent. of lime-powder with thirty-five per cent. of rosin.

It will be observed that I use the term "lime-powder" instead of "powdered lime," as I am fully aware that the slaked lime is a hydrate, and, speaking critically, may be said to be different from lime.

For the purposes of my invention, I regard the ground lime and the hydrate of lime as the same ingredient, for the reason that the water of crystallization combined in the hydrate does not effect any detrimental change in the composition I have described. If the lime is hydrated to powder, instead of ground or pulverized mechanically, care must be taken to add enough water to prevent the formation of granular crystals of hydrate. On the other hand, if the proportion of water added be too great, a pasty mass will result, instead of the light dry powder required. The air-slaked lime is of course free from either of these defects, and is very suitable for making my composition.

With the use of the lime-powder in any proportion between fifty and ninety per cent. of the composition the product is entirely destitute of plasticity and ductility, but may be molded into any desired form while heated. To adapt it for coating telegraph-wires and other flexible conductors, I add from two to five per cent. of a fixed oil—as rosin-oil—while the mixture is in a fused state, and thus secure a composition of such flexibility that when applied to metallic wires it will endure the bending required in a coating, as commonly applied and used. The composition, when thus prepared, may be applied to the wires by heating them and drawing them through a bath of the fused material, after which they may be subjected to a scraper or grooved rollers to render the coating uniform. The resisting properties of the material are equally great, whether prepared with the ground or hydrated lime, a thin film of the compound resisting a current of fifteen ampères per second; but the compound prepared with ground lime will not resist moisture like the other, the water being slowly absorbed and disintegrating the material, while the compound prepared with hydrate of lime is entirely impervious to the action of water. As the pliable mixture containing a fixed oil derives its insulating properties entirely from the rosin and lime-powder ingredients, and is not dependent upon the oil therefor, it is evident that the insulating compound is the same in either case, but modified in a quality (flexibility) entirely independent of its insulating properties by the addition of the softening (oily) ingredient.

Letters Patent were issued to me on the 29th of May, 1883, for an insulating compound in which chalk was employed with resin; but that compound differed essentially, because in that compound the element (lime) is in the form of neutral carbonate, and in the compound herein described it is in the form of caustic oxide, the original carbonic acid having been driven off in the burning.

I therefore claim my insulating material, generically and specifically, in the following manner:

1. The electrical insulating material composed of caustic lime in powder, hydrated or otherwise, united with common rosin in a fused state, substantially in the manner and proportions specified herein.

2. The electrical insulating material composed of caustic lime in powder, common rosin, and a fixed oil, the whole combined substantially in the manner and proportions herein specified.

In testimony whereof I have hereunto set my hand in the presence of two subscribing witnesses.

JOHN GREIVES.

Witnesses:
ROBERT I. HOFFER,
WILLIAM W. WELCH.